(12) United States Patent
Lee

(10) Patent No.: US 8,676,042 B2
(45) Date of Patent: Mar. 18, 2014

(54) METHOD AND APPARATUS FOR SEEKING A FRAME IN MULTIMEDIA CONTENTS

(71) Applicant: Samsung Electronics Co. Ltd., Suwon-si (KR)

(72) Inventor: Chang-Joon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/666,292

(22) Filed: Nov. 1, 2012

(65) Prior Publication Data
US 2013/0216209 A1 Aug. 22, 2013

(30) Foreign Application Priority Data
Feb. 17, 2012 (KR) .......................... 10-2012-0016379

(51) Int. Cl.
*H04N 5/783* (2006.01)

(52) U.S. Cl.
USPC ............................. 386/343; 386/222; 704/500

(58) Field of Classification Search
USPC .................................. 386/222, 343; 704/500
See application file for complete search history.

(56) References Cited

U.S. PATENT DOCUMENTS

| 5,777,992 | A * | 7/1998 | Lokhoff | 370/389 |
| 5,903,872 | A * | 5/1999 | Fielder | 704/500 |
| 7,885,201 | B2 | 2/2011 | Kuo et al. | |
| 2005/0100122 | A1 * | 5/2005 | Hsu et al. | 375/354 |
| 2005/0147383 | A1 | 7/2005 | Ihara | |
| 2008/0039965 | A1 * | 2/2008 | Hung et al. | 700/94 |
| 2013/0138445 | A1 * | 5/2013 | Lee | 704/500 |

FOREIGN PATENT DOCUMENTS

| JP | 2005-310306 A | 11/2005 |
| JP | 2006-323886 A | 11/2006 |
| JP | 2007-095121 A | 4/2007 |

* cited by examiner

*Primary Examiner* — Helen Shibru
(74) *Attorney, Agent, or Firm* — Jefferson IP Law, LLP

(57) ABSTRACT

A multimedia content frame seeking method and apparatus is provided. The multimedia content frame seeking method may include setting a candidate position for a target frame, the target frame corresponding to a target time, according to an average bitrate of an average bitrate calculation section that is set with respect to frames in the multimedia content, adjusting the candidate position by progressively decreasing a size of the average bitrate calculation section based on the candidate position, and determining the target frame to be a frame having a start time that differs from the target time by a difference within a predetermined allowable range of error, wherein the target frame is determined from among frames of which starting points are closest to candidate positions.

13 Claims, 6 Drawing Sheets

METHOD AND APPARATUS FOR SEEKING A FRAME IN MULTIMEDIA CONTENTS

PRIORITY

This application claims the benefit under 35 U.S.C. §119 (a) of a Korean patent application filed in the Korean Industrial Property Office on Feb. 17, 2012 and assigned Serial No. 10-2012-0016379, the entire disclosure of which are hereby incorporated by reference.

BACKGROUND OF THE INVENTION

1. Field of the Invention

The present invention relates to playback of multimedia content. More particularly, the present invention relates to a method and apparatus for seeking a target frame from among all frames included in multimedia content.

2. Description of the Related Art

As portable multimedia playback devices have been developed and their performance has improved, portable consumption of large capacity multimedia content having a high bitrate, such as high definition video, lossless audio, and other similar large capacity media and multimedia content has increased.

Codecs may adopt a variable bitrate that allows encoding of multimedia data based on a characteristic of a frame, so as to provide a maximum compression rate and to secure a high quality for each frame of the large capacity multimedia content having a high bitrate, for example, a high definition video quality, a high sound quality, and the like.

However, when the multimedia data is encoded based on the variable bitrate, a bitrate of a frame is not fixed. Accordingly, to move to, i.e., determine or select, a predetermined position of multimedia content including frames having variable bitrates, all the frames up to the predetermined position may need to be parsed. This scheme may be referred to as a pre-rolling scheme that parses frames from a first frame up to a frame located at a desired point when performing seeking of the frame at the predetermined position. Although the pre-rolling scheme is readily embodied, the data parsed during seeking is discarded and thus, parsing is performed from the first frame every time it performs seeking. Accordingly, the pre-rolling scheme is inefficient and performance may be deteriorated in a case where a desired point is distant from the first frame.

In order to overcome the above noted drawback, a scheme that generates a seek table by parsing all the frames before decoding or a scheme that generates a seek table and inserts the generated seek table into a file format during encoding, may be used. However, due to the increase in large capacity multimedia content, the scheme based on the seek table may include problems, such as a slow seek time, use of a large amount of memory, a low accuracy in seeking a result, and the like.

According to the scheme for generating a seek table before decoding so as to reduce overhead from the scheme of parsing all the frames, all the frames may need to be parsed and the seek table may need to be initialized before decoding. The initialization of the seek table may cause a large amount of initial playback delay during decoding, and the initial playback delay may increase as a quantity of content and a length of playback time increase.

According to the scheme of generating a seek table and inserting the seek table into a file format during encoding so as to remove overhead occurring while generating the seek table during a decoding operation, a compression rate of an encoder may be deteriorated and thus, a limited number of seek tables may be generated. Accordingly, the seek table may have a low accuracy and thus, a result of a seeking operation using the seek table may be inaccurate. Also, an accuracy may be deteriorate as a playback time increases. In addition, when a seek table is deleted or damaged during storing or streaming, seeking performed based on the seek table may not be able to be carried out.

SUMMARY OF THE INVENTION

Aspects of the present invention are to address at least the above-mentioned problems and/or disadvantages and to provide at least the advantages described below. Accordingly, an aspect of the present invention is to provide a method and apparatus for promptly and accurately seeking a target frame in multimedia content.

Another aspect of the present invention is to provide a method and apparatus for promptly and accurately seeking a target frame in multimedia content without using a seek table.

In accordance with an aspect of the present invention, a multimedia content frame seeking method is provided. The method includes setting a candidate position for a target frame, the target frame corresponding to a target time, according to an average bitrate of an average bitrate calculation section that is set with respect to frames in the multimedia content, adjusting the candidate position by progressively decreasing a size of the average bitrate calculation section based on the candidate position, and determining the target frame to be a frame having a start time that differs from the target time by a difference within a predetermined allowable range of error, wherein the target frame is determined from among frames of which starting points are closest to candidate positions.

In accordance with another aspect of the present invention, a multimedia content frame seeking apparatus is provided. The apparatus includes a memory for storing data of frames in the multimedia content, and a controller for setting a candidate position for a target frame corresponding to a target time according to an average bitrate of an average bitrate calculation section that is set with respect to the frames, for adjusting the candidate position by progressively decreasing a size of the average bitrate calculation section based on the candidate position, and for determining the target frame to be a frame having a start time that differs from the target time by a difference within a predetermined allowable range of error, wherein the target frame is determined from among frames of which starting points are closest to candidate positions.

According to the exemplary embodiments of the present invention, an apparatus and a method that seek a target frame in multimedia content without parsing all frames from a first frame to a target frame of multimedia content and without using a seek table are provided.

According to exemplary embodiments of the present invention, an apparatus and a method that may not insert a seek table into a file format during encoding, and may not use an amount of memory required for generating and initializing the seek table during decoding and thus, may improve a loading speed of a decoder and may promptly and accurately seek a target frame are provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
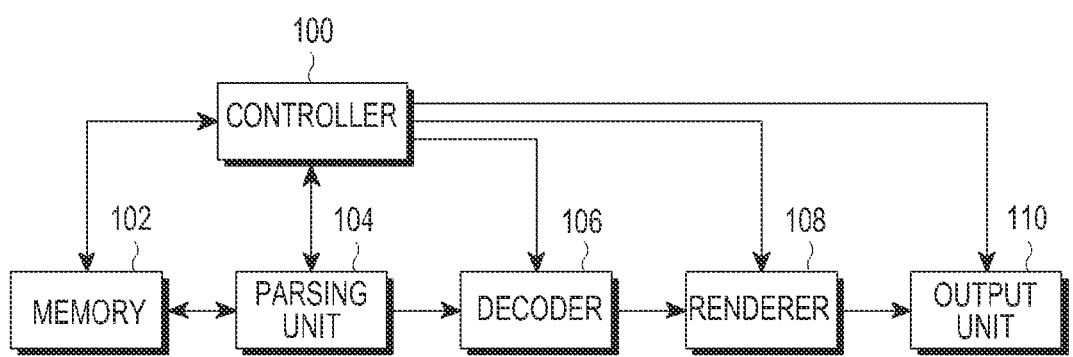
FIG. 1 is a block diagram illustrating a multimedia content player including a multimedia content frame seeking apparatus according to an exemplary embodiment of the present invention.

FIG. 1 illustrates a multimedia content player including a multimedia content frame seeking apparatus according to an exemplary embodiment of the present invention.

Referring to FIG. 1, a controller 100 may control a memory 102, a parsing unit 104, a decoder 106, a renderer 108, and an output unit 110, so as to control a function of the multimedia content player. The memory 102 may store at least one multimedia content to be played back by the multimedia content player of FIG. 1. The parsing unit 104 may read data of the multimedia content stored in the memory 102, and may parse the read data. The decoder 106 may decode the data parsed by the parsing unit 104. The renderer 108 may render the data decoded by the decoder 106. The output unit 110 may include an output device, such as a speaker, a display, and other similar output devices in order to output audio data, video data, and other data rendered by the renderer 108.

Hereinafter, seeking of a frame in the multimedia content of the multimedia content player of FIG. 1 is described with respect to the controller 100 that performs the seeking of the frame in the multimedia content stored in the memory 102. The multimedia content frame seeking apparatus may include the memory 102 and the controller 100. However, the present invention is not limited there to, and the seeking of the frame may be executed by the parsing unit 104, or any other suitable element, unit or item, instead of the controller 100.

The controller 100 may seek a target frame corresponding to a target time from among frames of the multimedia content stored in the memory 102, wherein the multimedia content includes frames of variable bitrates. The target time may correspond to a playback time that is selected by a user from among the entire playback time so that a playback point is determined to be the selected playback time.

The controller 100 may determine a candidate position as the target frame corresponding to the target time according to an Average Bitrate (ABR) of an ABR calculation section set with respect to the frames of the multimedia content stored in the memory 102. The controller 100 may also adjust the candidate position by progressively narrowing the ABR calculation section based on the candidate position. In the present exemplary embodiment, the controller 100 may repeatedly adjust the candidate position until a difference between a start time of a frame that is closest to the candidate position and the target time is within an allowable range of error T. For example, the allowable range of error T may be determined to be a time range in which a start time of the frame closest to the candidate position is considered to be similar to the target time, for example, time ranges of 0.1 seconds, 0.5 seconds, 1 second, or any other suitable amount of time. The allowable range of error T may be predetermined.

Hereinafter, setting and adjusting a candidate position by the controller 100 will be described. The controller 100 may set the entire data of the multimedia content to be an ABR calculation section. The controller 100 may also set, as a candidate position, a position that is spaced a distance away from a starting point of the entire data based on an ABR of the entire data, wherein the distance corresponds to a data size corresponding to the target time. The controller 100 may seek a frame closest to the currently set candidate position from among frames of the entire data of the multimedia content, and may set a start time of the sought frame as a candidate time. Subsequently, the controller 100 may compare a difference between the target time and the candidate time to the allowable range of error T. When the difference between the target time and the candidate time exceeds the allowable range of error T, the controller 100 may reset, as an ABR calculation section, a remaining section, excluding a section existing outside the candidate position, in a direction from the target time to the candidate time in the currently set ABR calculation section. Accordingly, the controller 100 may adjust the currently set candidate position by a data size corresponding to the difference between the target time and the candidate time, based on an ABR of the reset ABR calculation section. After adjusting the candidate position as described in the foregoing, the controller 100 may repeat the operations from an operation of the setting of the candidate time based on the adjusted candidate position.

The controller 100 may determine the target frame to be a frame having a start time that differs from the target time by a difference, i.e., an amount of time, within the allowable range of error T, from among frames of which starting points are closest to candidate positions that are set and adjusted as described in the foregoing.

Figure 2A:
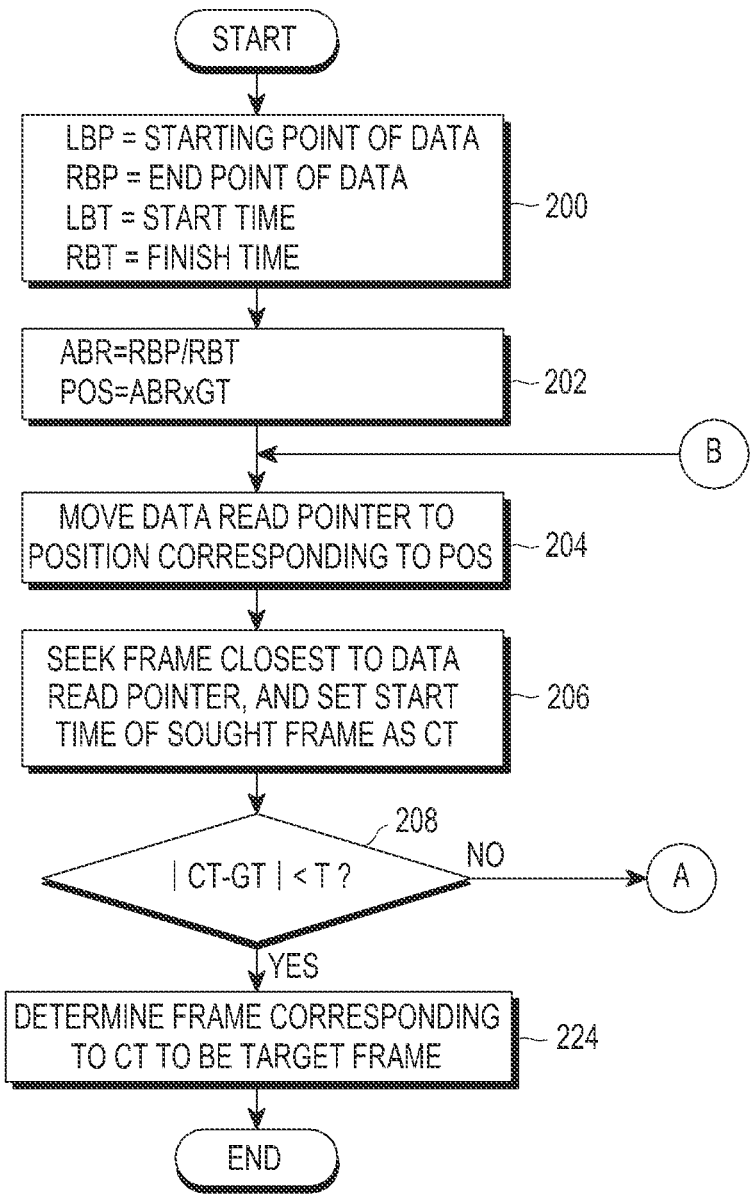
FIGS. 2A and 2B are flowcharts illustrating a multimedia content frame seeking method according to an exemplary embodiment of the present invention.
Figure 2B:
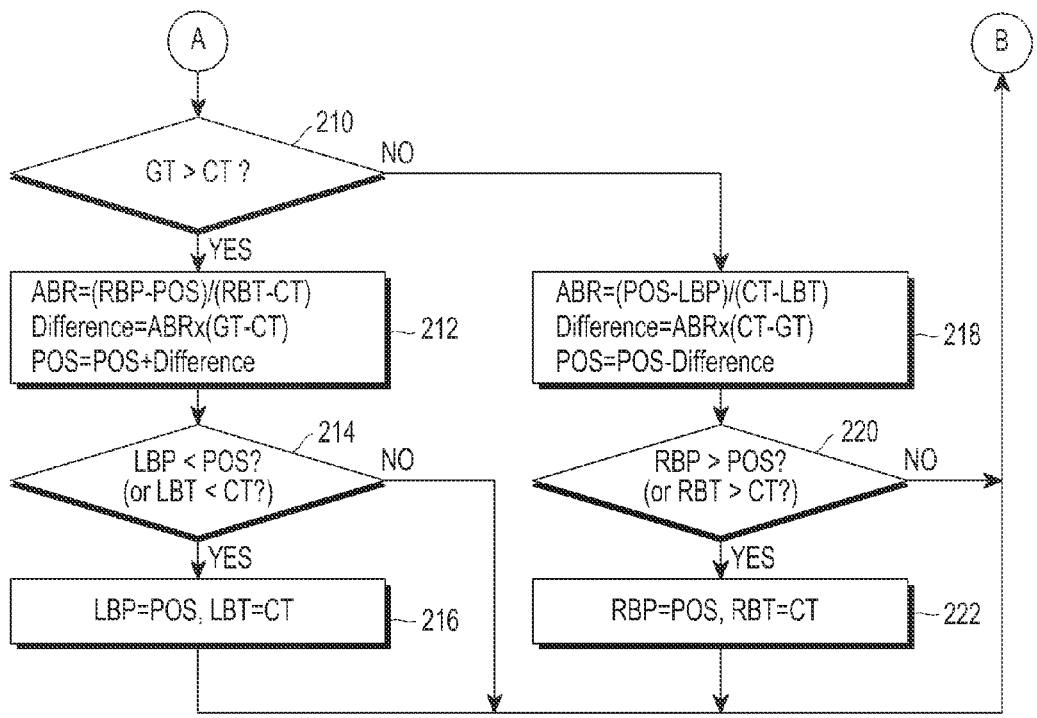
Figure 3:
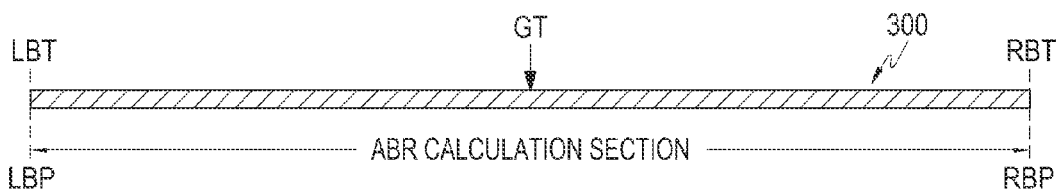
FIGS. 3 through 6F are diagrams illustrating examples of a multimedia content frame seeking method according to an exemplary embodiment of the present invention.

FIGS. 2A and 2B illustrate a multimedia content frame seeking method performed by the controller 100 according to an exemplary embodiment of the present invention. FIG. 2A and FIG. 2B are connected to each other through reference symbols A and B. FIGS. 3 through 6F illustrate examples of a multimedia content frame seeking method according to an exemplary embodiment of the present invention.

Referring to FIGS. 2A and 2B, the controller 100 may initialize variables to be used for seeking a frame, the variables including a Left Boundary Position (LBP), a Right Boundary Position (RBP), a Left Boundary Time (LBT), and a Right Boundary Time (RBT) in step 200. The LBP is a starting point of an ABR calculation section, the RBP is an end point of the ABR calculation section, the LBT is a start time of the ABR calculation section, and the RBT is an end time of the ABR calculation section. Accordingly, the LBT is a time corresponding to the LBP, and the RBT is a time corresponding to the RBP.

In step 200, the controller 100 may initialize the LBP to be a starting point of the entire data of the multimedia content, may initialize the RBP to be an end point of the entire data of the multimedia content, may initialize the LBT to be a start time corresponding to the starting point of the entire data of the multimedia content, and may initialize the RBT to be a finish time corresponding to the end point of the entire data of the multimedia content. The entire data of the multimedia content may correspond substantially to data that is to be played back, excluding various additional information or data that may be disposed at a front side of the entire data of the multimedia content.

Next, in step 202, the controller 100 may calculate an ABR based on Equation 1, and may set a candidate POSition (POS) for a target frame corresponding to a target time, wherein the target time may be referred to as a Goal Time (GT), based on the calculated ABR. The GT may correspond to a playback time that is selected by a user from among the entire playback time of the multimedia content so as to put a playback point at the selected playback time.

$$ABR = RBP/RBT$$

$$POS = ABR \times GT \qquad \text{Equation 1}$$

That is, the controller 100 may set, as an ABR calculation section, an entire data 300 (see FIG. 3) of the multimedia content to which seeking is to be performed, and may calculate the ABR of the entire data 300 based on Equation 1.

Figure 4A:
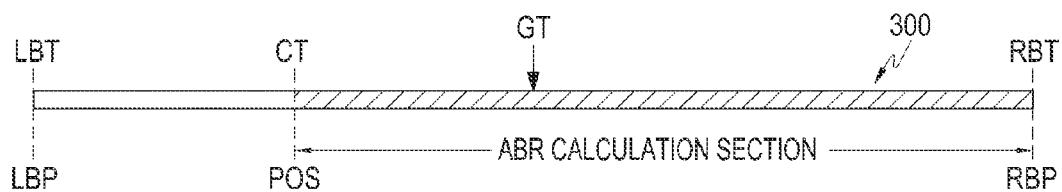
Figure 5A:
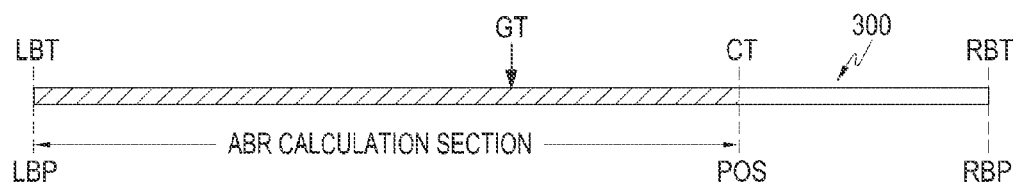
Figure 5B:
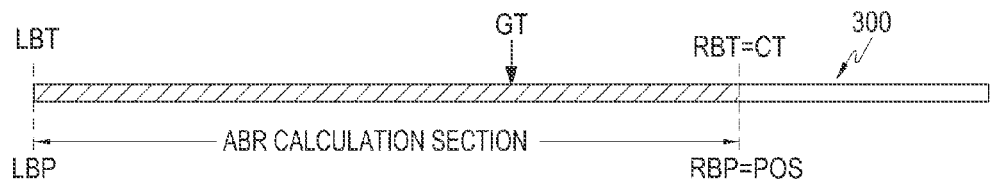

The controller 100 may set a POS according to Equation 1. That is, a position that is spaced a distance away from a starting point of the entire data 300 may be set to be the POS, wherein the distance corresponds to a data size corresponding to a GT. The POS may be identical to a starting point of a target frame corresponding to the GT. However, the POS has a high probability of existing before or after the starting point of the target frame since the POS is determined according to the ABR. That is, the POS may exist before the GT, as illustrated in FIG. 4A, or may exist after the GT as illustrated in FIG. 5A.

Next, in step 204, the controller 100 may move a data read pointer to a position corresponding to the POS in the entire data 300 of the multimedia content stored in the memory 102. In step 206, the controller 100 may seek a frame of which a starting point is closest to the data read pointer, and may set a start time of the sought frame as a Candidate Time (CT).

A starting point of the sought frame may be identical to the POS, or may have a slight difference from the POS when the POS is located in the sought frame. However, the difference between the starting point of the sought frame and the POS may be disregarded since a frame closest to the data read pointer corresponding to the POS is sought. Accordingly, for ease of description, it is described that a CT corresponds to a POS, as illustrated in FIGS. 4A through 6F that illustrate examples of the multimedia content frame seeking method performed by the controller 100.

The start time of the frame sought in step 206 may be obtained by parsing or calculating the sought frame. A scheme of obtaining the start time of the sought frame may vary according to a file format of the multimedia content, since information that is associated with a frame and is included in a header of the frame may vary according to the file format of the multimedia content.

The information included in the header of the frame of the multimedia content may be, for example, a frame number, such as a file format based on a Free Lossless Audio Codec (FLAC). When the information included in the header of the frame is the frame number, the frame number may indicate an ordinal number of the frame from among all frames included in the multimedia content. A number of samples of all the frames prior to the sought frame may be calculated by multiplying a number, which is one less than a number of frames corresponding to the frame number, by a number of samples used for encoding one frame. Additionally, the start time of the sought frame may be calculated by dividing the number of samples of all the frames by a sampling rate.

As another example, the information included in the header of the frame of the multimedia content may be, for example, a sample number for a file format based on an Ogg Vorbis (OGG). When the information included in the header of the frame is the sample number, the sample number may indicate an ordinal number of samples corresponding to the frame from among all encoded samples that are associated with the multimedia content. The start time of the sought frame may be calculated by dividing a number of samples corresponding to the sample number by a sampling rate.

Also, information included in the header of the frame of the multimedia content may be time information. For example, the time information may indicate a time elapsed from a start time of the multimedia content to the start time of the frame. The time information included in the header of the sought frame may correspond to the start time of the sought frame and thus, a separate calculation may be not needed for determining the start time.

After step 206, the controller 100 may compare an absolute value of a difference between the CT and the GT with the allowable range of error T in step 208. When the difference is less than the allowable range of error T, the controller 100 may proceed with step 224 in order to determine that the frame corresponding to the CT is the target frame. Otherwise, the controller 100 may proceed with step 210, which is shown in FIG. 2B.

In step 210, the controller 100 may compare the CT and the GT. When the CT is less than the GT, as illustrated in FIG. 4A, the controller 100 may proceed with step 212. When the CT is greater than GT, the controller 100 may proceed with step 218.

In step 212, the currently set POS may be adjusted based on Equation 2.

$$ABR = (RBP - POS)/(RBT - CT)$$

$$\text{Difference} = ABR \times (GT - CT)$$

$$POS = POS + \text{Difference} \qquad \text{Equation 2}$$

In Equation 2, ABR denotes an average bitrate, POS denotes a candidate position, GT denotes a target time, CT denotes a candidate time, RBT denotes an end point of an ABR calculation section, RBT denotes a finish time of the ABR calculation section, and Difference denotes a data size corresponding to a difference between the GT and the CT based on an ABR of the ABR calculation section.

With respect to step 212, when a result of the comparison in step 210 shows that the CT is less than the GT, that is, when the POS exists before the GT, as illustrated in FIG. 4A, the ABR calculation section may be reset to be between the RBP and the POS, and an ABR may be calculated with respect to the RBP–POS based on Equation 2 in step 212. The Difference corresponding to the data size of the difference between the GT and the CT may be calculated by multiplying the difference between the GT and the CT by the ABR of the RBP–POS. Accordingly, the POS may be adjusted by adding the calculated Difference and the currently set POS, based on Equation 2. That is, the POS may be adjusted by the Difference, which corresponds to the data size of the difference between the GT and the CT according to Equation 2.

Figure 4B:
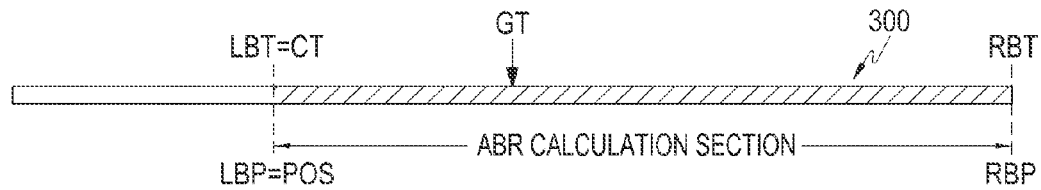

After step 212, the controller 100 may determine whether to update the LBP and the LBT in step 214. In further detail, the controller 100 may determine whether the POS is greater than the LBP or whether the CT is greater than the LBT, and if either is true, the controller 100 may update the LBP with a value of the POS and may update the LBT with a value of the CT in step 216 of FIG. 2, and as illustrated in FIG. 4B. After step 216, the controller 100 may return to step 204 of FIG. 2A. When the controller 100 determines that the POS is less than the LBP in step 214, then the controller 100 skips step 216 and returns to step 204. Additionally, when the controller 100 determines that the CT is less than the LBT, then the controller 100 skips step 216 and returns to step 204. In the present exemplary embodiment, the CT is a time corresponding to the POS, and the LBT is a time corresponding to the LBP and thus, whether the LBP and the LBT are to be updated may be determined according to whether the POS is greater than the LBP or according to whether the CT is greater than the LBT, as determined in step 214.

In step 218, the currently set POS may be adjusted according to Equation 3.

$$ABR=(POS-LBP)/(CT-LBT)$$

$$Difference=ABR \times (CT-GT)$$

$$POS=POS-Difference \qquad \text{Equation 3}$$

In Equation 3, the ABR denotes an average bitrate, the POS denotes a candidate position, the GT denotes a target time, the CT denotes a candidate time, the LBP denotes a starting point of an ABR calculation section, the LBT denotes a start time of the ABR calculation section, and the Difference denotes a data size corresponding to a difference between the GT and the CT according to an ABR of the ABR calculation section.

In step 218, when a result of the comparison in step 210 shows that the CT is greater than the GT, that is, when the POS exists after the GT as illustrated in FIG. 5A, then the ABR calculation section may be reset to be between the POS and the LBP, as illustrated in FIG. 5A. Accordingly, in step 218, an ABR may be calculated with respect to the POS–LBP according to Equation 3. As shown in Equation 3, the Difference corresponding to the data size of the difference between the GT and the CT may be calculated by multiplying the difference between the GT and the CT by the ABR of the RBP–POS, and the POS may be adjusted by subtracting the calculated Difference from the currently set POS. That is, the POS may be adjusted by the Difference corresponding to the data size of the difference between the GT and the CT.

After step 218, the controller 100 may determine whether to update the RBP and the RBT in step 220. In further detail, the controller 100 may determine whether the POS is less than the RBP or whether the CT is less than the RBT. If the POS is less than the RBP or if the CT is less than the RBT, then, in step 222, the controller 100 may update the RBP with a value of the POS and may update the RBT with a value of the CT. After performing step 222, the controller 100 may return to step 204. However, when the controller 100 determines that the POS is greater than the RBP in step 220, the controller 100 may skip step 222, and instead return to step 204. Additionally, when the controller 100 determines that the CT is greater than the RBT, the controller 100 may skip step 220, and return to step 204. In the present exemplary embodiment, the CT is a time corresponding to the POS, and the RBT is a time corresponding to the RBP and thus, whether the RBP and the RBT are to be updated may be determined by determining whether the POS is less than the RBP or determining whether the CT is less than the RBT in step 220.

Accordingly, when the difference between the GT and the CT exceeds the allowable range of error T, the controller 100 may reset, as an ABR calculation section, a remaining section excluding a section existing outside the POS along a direction from the GT to the CT in the currently set ABR calculation section in steps 210 through 222. Additionally, the controller 100 may adjust the currently set POS by a Difference corresponding to a data size of the difference between the GT and the CT, based on an ABR of the reset ABR calculation section, and may return to step 204 so as to repeat the steps from a step of setting a CT based on the adjusted POS.

Accordingly, when the POS that is set in step 202 is different from the starting point of the target frame corresponding to the GT, that is, when the POS exists before the GT, as shown in FIG. 4A, or exists after the GT, as shown in FIG. 5A, step 204 through step 222 may be repeatedly performed and thus, a POS corresponding to a CT that differs from the GT by a difference within the allowable rage of error T may be sought.

Figure 6A:
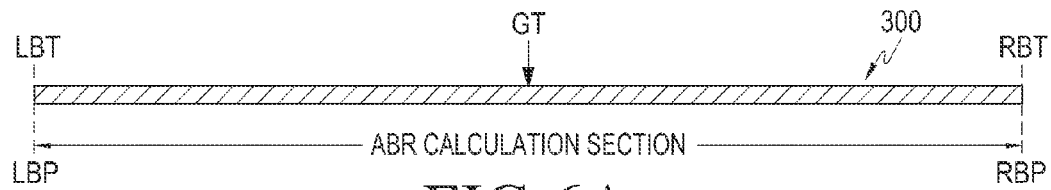

FIGS. 6A through 6F illustrate examples of setting and adjusting a POS. FIG. 6A illustrates that an ABR calculation section is set with respect to the entire data 300 in step 202 of FIG. 2A. FIGS. 6B through 6F illustrate that the POS is adjusted so as to correspond to a CT that differs from a GT by a difference within the allowable range of error T according to steps 204 through 222, and the POS is located at a starting point of a target frame corresponding to the GT.

Figure 6B:
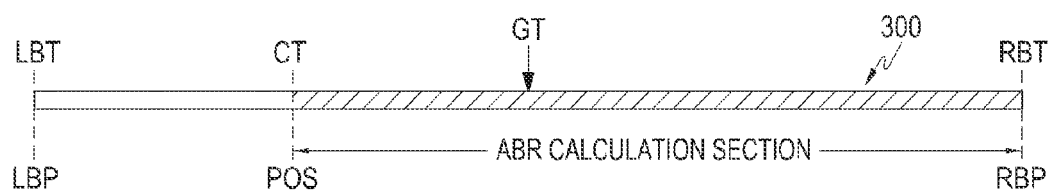

FIG. 6B illustrates a case where a CT corresponding to a POS that is set based on an ABR of the entire data 300 (see FIG. 6A) exists before the GT. The ABR calculation section is reset to be from the RBP to the POS. Accordingly, the reset ABR calculation section of FIG. 6B may be smaller than the ABR calculation section of FIG. 6A.

Figure 6C:
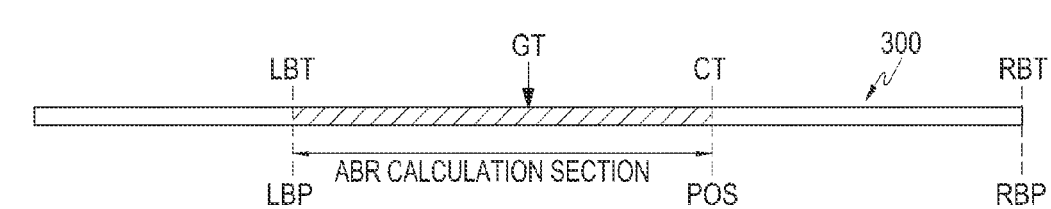

FIG. 6C illustrates a case where the POS and the CT of FIG. 6B are updated to be an LBP and an LBT, since the ABR calculation section is reset to be as shown in FIG. 6B. Additionally, a CT corresponding to a POS based on an ABR of the reset ABR calculation section exists after the GT, wherein the ABR calculation section is reset to be from the POS to the LBP. In FIG. 6C, a difference between the CT and the GT is smaller than such a difference as found in FIG. 6B, and the reset ABR calculation section of FIG. 6C is smaller than that of FIG. 6B.

Figure 6D:
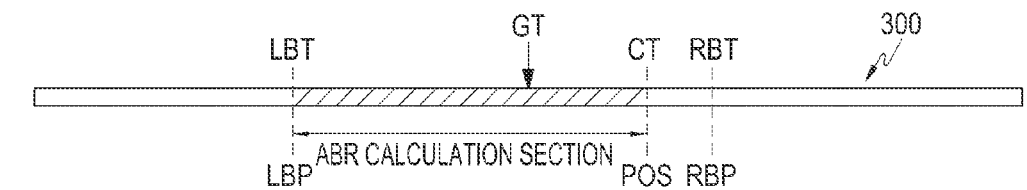

FIG. 6D illustrates an example where the POS and the CT of FIG. 6C are updated to be an RBP and an RBT because the ABR calculation section is reset to be as shown in FIG. 6C. Additionally, a CT corresponding to a POS, which is based on an ABR of the reset ABR calculation section of FIG. 6C, exists after the GT, wherein the ABR calculation section is reset to be from the POS to the LBP. Here, in FIG. 6D, although the CT corresponding to the POS exists after the GT, a difference between the CT and the GT is smaller than such a difference in FIG. 6C, and the reset ABR calculation section is smaller than that of FIG. 6C.

Figure 6E:
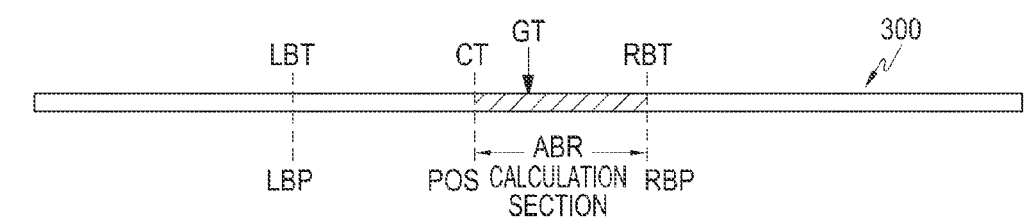

FIG. 6E illustrates an example where the POS and the CT of FIG. 6D are updated to be the RBP and the RBT because the ABR calculation section is reset as shown in FIG. 6D. Additionally, a CT corresponding to a POS, which is based on an ABR of the reset ABR calculation section of FIG. 6C, exists before the GT, wherein the ABR calculation section is reset to be from the RBP to the POS. Here, in FIG. 6E, although the CT corresponding to the POS exists before the GT, a difference between the CT and the GT is smaller than such a difference in FIG. 6D, and the reset ABR calculation section is smaller than that of FIG. 6D.

Figure 6F:
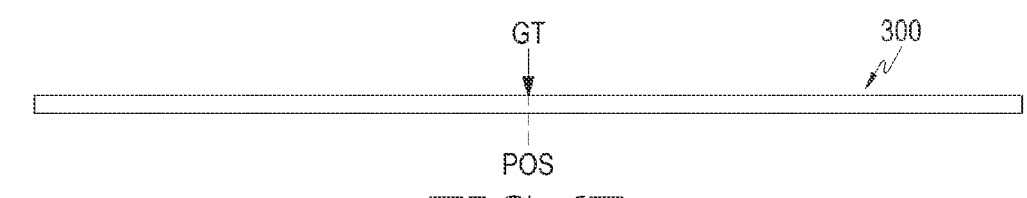

FIG. 6F illustrates an example where the POS is adjusted to be a POS corresponding to a CT that differs from the GT by a difference within the allowable rage of error T through operations described in FIGS. 6B through 6D. Accordingly, the POS is located at the starting point of the target frame corresponding to the GT.

As described in the foregoing with reference to FIGS. 6A through 6F, the controller 100 may set the POS associated with the target frame corresponding to the GT based on the ABR of the ABR calculation section that is set with respect to frames in the multimedia content stored in the memory 102. Additionally, the controller 100 may adjust the POS by progressively narrowing the ABR calculation section based on steps 200 through 222 of FIGS. 2A and 2B. In the present exemplary embodiments, the adjusting of the POS is repeatedly performed until a difference between the GT and a CT, wherein the CT corresponds to a starting time of a frame closest to the POS, is within the predetermined allowable range of error T.

When the result of the comparison in step 208 of FIG. 2A shows that the difference between the CT and the GT is less than the allowable range of error T, the controller 100 may determine a frame corresponding to the CT to be the target frame in step 218, and may complete the seeking of the target frame.

Although the exemplary embodiments describe seeking a frame in multimedia content including frames having variable bitrates, the present invention is not limited thereto, and may be applicable for seeking a frame in multimedia content including frames having constant bitrates. Although the exemplary embodiments describes that the controller 100 performs seeking a frame in multimedia content, the present invention is not limited thereto and the parsing unit 104, or any other suitable unit or element, may perform the seeking of a frame instead of the controller 100. In such a case, the parsing unit 104, or any other suitable unit or element, may function as a controller to control the seeking of the frame in the multimedia content. Furthermore, in a case where a controller of a multimedia content player includes a parsing unit, the seeking of the frame in the multimedia content may be performed by the controller including the parsing unit.

The above-described exemplary embodiments of the present invention may be embodied as hardware, or a combination of hardware and software. Software may be stored in a volatile or non-volatile non-transitory storage device such as Read Only Memory (ROM) and Random Access Memory (RAM) irrespective of erasing or rewriting or a storage medium that is capable of performing optical or magnetic recording and machine-reading such as Compact Disc (CD), Digital Versatile Disc (DVD), optical disc, magnetic tape, and the like. A memory that may be included in a mobile terminal equipped with a multimedia content player may be an example of machine-readable non-transitory storage media that are suitable for storing a program including instructions to implement the exemplary embodiments, or programs. Therefore, the exemplary embodiments of the present invention may include a program including a code to implement an apparatus or a method claimed in a claim of the specification, and a machine-readable non-transitory storage medium including the program, for example, a computer-readable non-transitory storage medium. The program may be transferred electronically through a medium such as a communication signal transferred through a wired or wireless connection.

The multimedia content frame seeking method according to the exemplary embodiments of the present invention may be manufactured as a program so as to be stored in a storage medium, which may be a non-transient storage medium. A mobile terminal equipped with a multimedia content player may execute the program by installing or downloading the program to control applications, from a program provision server and may use the program for seeking a frame in multimedia content. When the program to be used for seeking a frame in the multimedia content is installed in the mobile terminal, the program may be executed in the mobile terminal, and may provide a service of seeking a frame in the multimedia content, which may be stored in the mobile terminal. The program provision server may receive a request for the program from the mobile terminal, and may transmit the program to the mobile terminal in response to the request. The program server may additionally perform a determining of whether the mobile terminal that requests transmission of the program is a subscriber of the service, a user authentication, a confirmation of payment, and other similar operations. The program provision server may include the storage medium that stores the program. Also, the storage medium may be included in the program provision server or may exist outside the program provision server.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of seeking a frame in multimedia content, the method comprising:
setting a candidate position for a target frame, the target frame corresponding to a target time, according to an average bitrate of an average bitrate calculation section that is set with respect to frames in the multimedia content;
adjusting the candidate position by progressively decreasing a size of the average bitrate calculation section based on the candidate position; and
determining the target frame to be a frame having a start time that differs from the target time by a difference within a predetermined allowable range of error,
wherein the target frame is determined from among frames of which starting points are closest to candidate position.

2. The method of claim 1, wherein the frames in the multimedia content have variable bitrates.

3. The method of claim 1, wherein the adjusting of the candidate position is repeatedly performed until a difference between a start time of a frame closest to the candidate position and the target time is within the allowable range of error.

4. The method of claim 3, wherein setting of the candidate position comprises:
setting an entire data of the multimedia content as the average bitrate calculation section; and setting a position spaced a distance away from a starting point of the entire data as the candidate position according to an average bitrate of the entire data,
wherein the distance corresponds to a data size corresponding to the target time.

5. The method of claim 4, wherein adjusting of the candidate position comprises:
seeking a frame having a starting point that is closest to the currently set candidate position from among the frames, and setting a start time of the sought frame as a candidate time;
comparing a difference between the target time and the candidate time to the allowable range of error;
resetting, as an average bitrate calculation section, a remaining section excluding a section existing beyond the candidate position in a direction from the target time to the candidate time in the currently set average bitrate calculation section when the difference between the target time and the candidate time exceeds the allowable range of error, and adjusting the currently set candidate position by a data size corresponding to the difference between the target time and the candidate time according to an average bitrate of the reset average bitrate calculation section; and
repeatedly performing the seeking of the frame, the comparing of the difference between the target time and the candidate time to the allowable range of error, and the resetting of the remaining section after the candidate position is adjusted.

6. The method of claim 5, wherein the candidate position is determined according to Equation 1, and
wherein the adjusting of the candidate position comprises:
comparing the candidate time and the target time;
adjusting the currently set candidate position according to Equation 2 when the candidate time is less than the target time; and
adjusting the currently set candidate position according to Equation 3 when the candidate time is greater than the target time,
wherein Equation 1 is expressed by $$ABR=RBP/RBT$$

$$POS=ABR \times GT,$$

Equation 2 is expressed by $$ABR=(RBP-POS)/(RBT-CT)$$

$$Difference=ABR \times (GT-CT)$$

$$POS=POS+Difference, \text{ and}$$

Equation 3 is expressed by $$ABR=(POS-LBP)/(CT-LBT)$$

$$Difference=ABR \times (CT-GT)$$

$$POS=POS-Difference, \text{ and}$$

wherein ABR denotes an average bitrate, POS denotes a candidate position, GT denotes a target time, CT denotes a candidate time, LBP denotes a starting point of an average bitrate calculation section, LBT denotes a start time of an average bitrate calculation section, RBP denotes an end point of an average bitrate calculation section, RBT denotes a finish time of an average bitrate calculation section, and Difference denotes a difference between a target time and a candidate time based on an average bitrate of an average bitrate calculation section.

7. The method of claim 6, wherein the adjusting of the candidate position according to Equation 2 further comprises:
updating a currently set LBP with a value of a currently set candidate position and updating the LBT with a value of the candidate time when at least one of the currently set candidate position is greater than the currently set LBP and the candidate time is greater than the LBT, and
wherein the adjusting of the candidate position based on Equation 3 further comprises:
updating a currently set RBP with a value of the currently set candidate position and updating the RBT with a value of the candidate time when the currently set candidate position is less than the currently set RBP or the candidate time is less than the RBT.

8. An apparatus for seeking a frame in multimedia content, the apparatus comprising:
a memory for storing data of frames in the multimedia content; and
a controller for setting a candidate position for a target frame corresponding to a target time according to an average bitrate of an average bitrate calculation section that is set with respect to the frames, for adjusting the candidate position by progressively decreasing a size of the average bitrate calculation section based on the candidate position, and for determining the target frame to be a frame having a start time that differs from the target time by a difference within a predetermined allowable range of error,
wherein the target frame is determined from among frames of which starting points are closest to candidate positions.

9. The apparatus of claim 8, wherein the frames in the multimedia content have variable bitrates.

10. The apparatus of claim 8, wherein the controller repeatedly adjusts the candidate position until a difference between a start time of a frame closest to the candidate position and the target time is within the allowable range of error.

11. The apparatus of claim 10, wherein the controller is for:
setting of an entire data of the multimedia content as the average bitrate calculation section, setting of a position spaced a distance away from a starting point of the entire data as the candidate position according to an average bitrate of the entire data, such that the distance corresponds to a data size corresponding to the target time;
seeking of a frame having a starting point that is closest to the currently set candidate position from among the frames, and setting of a start time of the sought frame as a candidate time;
comparing of a difference between the target time and the candidate time to the allowable range of error;
resetting of, as an average bitrate calculation section, a remaining section excluding a section existing beyond the candidate position in a direction from the target time to the candidate time in the currently set average bitrate calculation section when the difference between the target time and the candidate time exceeds the allowable range of error, and adjusting of the currently set candidate position by a data size corresponding to the difference between the target time and the candidate time according to an average bitrate of the reset average bitrate calculation section; and
repeatedly performing of the seeking of the frame, the comparing of the difference between the target time and the candidate time to the allowable range of the error, and the resetting of the remaining section after the candidate position is adjusted.

12. The apparatus of claim 11, wherein the controller is for:
determining of the candidate position according to Equation 1; and
comparing of the candidate time and the target time, adjusting of the currently set candidate position according to Equation 2 when the candidate time is less than the target time, and adjusting of the currently set candidate position according to Equation 3 when the candidate time is greater than the target time,
wherein Equation 1 is expressed by $$ABR=RBP/RBT$$

$$POS=ABR \times GT,$$

Equation 2 is expressed by $$ABR=(RBP-POS)/(RBT-CT)$$

$$Difference=ABR \times (GT-CT)$$

$$POS=POS+Difference, \text{ and}$$

Equation 3 is expressed by $$ABR=(POS-LBP)/(CT-LBT)$$

$$Difference=ABR \times (CT-GT)$$

$$POS=POS-Difference, \text{ and}$$

wherein ABR denotes an average bitrate, POS denotes a candidate position, GT denotes a target time, CT denotes a candidate time, LBP denotes a starting point of an average bitrate calculation section, LBT denotes a start time of an average bitrate calculation section, RBP denotes an end point of an average bitrate calculation section, RBT denotes a finish time of an average bitrate calculation section, and Difference denotes a difference between a target time and a candidate time based on an average bitrate of an average bitrate calculation section.

13. The apparatus of claim 12, wherein the controller is for:
updating of a currently set LBP with a value of a currently set candidate position and updating of the LBT with a value of the candidate time when at least one of the currently set candidate position is greater than the currently set LBP and the candidate time is greater than the LBT if the controller adjusts the candidate position according to Equation 2; and
updating of a currently set RBP with a value of a currently set candidate position and updating of the RBT with a value of the candidate time when the currently set candidate position is less than the currently set RBP or the candidate time is less than the RBT if the controller adjusts the candidate position according to Equation 3.

* * * * *